United States Patent
Aiello et al.

(10) Patent No.: US 6,650,095 B2
(45) Date of Patent: Nov. 18, 2003

(54) LOW POWER, DUAL OUTPUT AC/DC AND DC/DC CONVERTER

(75) Inventors: Natale Aiello, Trecastagni (IT); Francesco Giovanni Gennaro, S. Agata Li Battiati (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 10/087,603

(22) Filed: Mar. 1, 2002

(65) Prior Publication Data

US 2002/0125864 A1 Sep. 12, 2002

(30) Foreign Application Priority Data

Mar. 9, 2001 (IT) .................................... TO2001A0219

(51) Int. Cl.[7] .............................................. G05F 1/577
(52) U.S. Cl. .............................. 323/267; 307/31; 307/33
(58) Field of Search ................................. 323/267, 265; 307/31, 33, 15, 32

(56) References Cited

U.S. PATENT DOCUMENTS

| | | | | |
|---|---|---|---|---|
| 3,328,674 A | * | 6/1967 | Bleicher | ...................... 323/267 |
| 3,671,853 A | * | 6/1972 | Weischedel et al. | ......... 323/267 |
| 5,119,013 A | * | 6/1992 | Sabroff | ......................... 323/267 |
| 5,886,508 A | * | 3/1999 | Jutras | ........................... 323/267 |
| 5,896,284 A | * | 4/1999 | Murasato et al. | ........... 363/124 |
| 6,400,588 B1 | * | 6/2002 | Peron | ........................... 363/63 |

* cited by examiner

Primary Examiner—Shawn Riley
(74) Attorney, Agent, or Firm—Lisa K. Jorgenson; Dennis M. de Guzman; Seed IP Law Group PLLC (57) ABSTRACT

The converter uses the energy stored in the output filter of a step-down (or buck) converter and in the inductor of a step up/down (or buck-boost) converter to supply a second output of opposite sign. In particular, the converter has a first input receiving an input voltage; a first output supplying a first output voltage of a first sign; a second output supplying a second output voltage of opposite sign; a controlled switch connected between the first input and a first intermediate node; an inductor connected between the first intermediate node and the first output; a diode connected between the first intermediate node and a second intermediate node; and a dual voltage generating circuit connected between the second intermediate node and the second output.

33 Claims, 4 Drawing Sheets

LOW POWER, DUAL OUTPUT AC/DC AND DC/DC CONVERTER

BACKGROUND OF THE INVENTION

1. Field of the Invention

The present invention relates to a low power AC/DC and DC/DC converter. In particular, the invention relates to an AC/DC and DC/DC converter having a circuit topology of the buck (or step down or forward) type or of the buck-boost (or step up/down or flyback) type.

2. Description of the Related Art

As is known, AC/DC and DC/DC converters having a circuit topology of the buck type or of the buck-boost type use inductive components the charging and discharging of which are controlled by switches that switch between a saturation and an inhibition condition (ON/OFF).

For a more detailed treatment of AC/DC and DC/DC converters of the type referred to above, see, for example, J. G. Kassakian, M. F. Schlecht, G. C. Verghese "Principles of Power Electronics," Addison Wesley.

Figure 1:
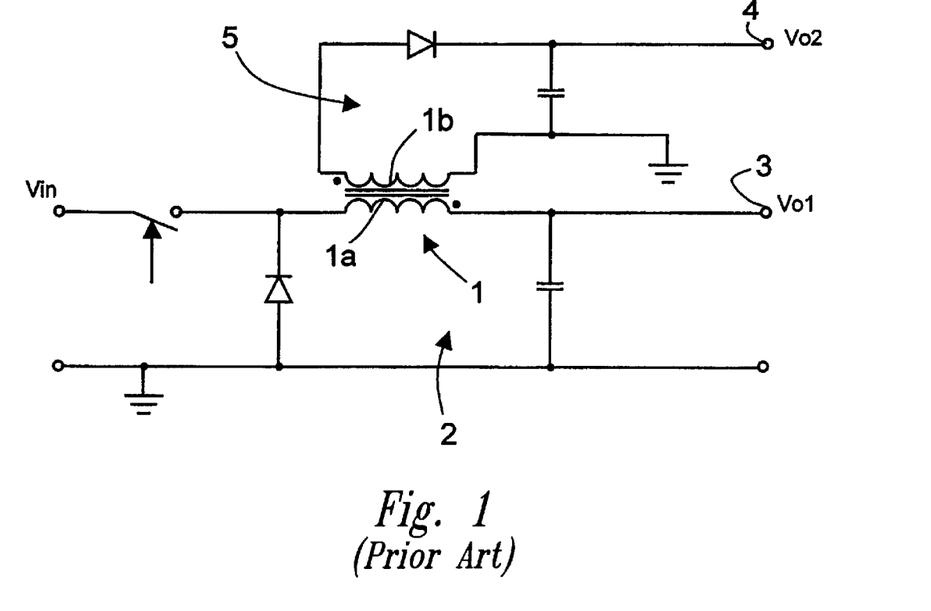
FIG. 1 illustrates a circuit diagram of a known dual output converter.

In certain applications, AC/DC and DC/DC converters having dual outputs are required, i.e., converters able to supply both a positive voltage and a negative voltage. For this purpose (see, for example, the standard buck converter of FIG. 1), an inductor 1 belonging to an output filter 2 has a first winding 1a connected to a first output 3 and a second winding 1b, appropriately coupled to the first winding 1a, connected to a second output 4 through a second output filter 5.

The above solution is adequate in the case of converters with a high output current, where wound inductors are used; however, it is not convenient in the case of converters supplying a low output current, where the inductor is formed by an axial inductor insulated in lacquer, that has a low cost and small dimensions.

BRIEF SUMMARY OF THE INVENTION

An embodiment of the present invention provides a converter that is able to supply a dual output without requiring the use of a double winding inductor. An inductor that can be used in the case of a non-insulated converter.

In one embodiment of the present invention there is provided a converter comprising a first input receiving an input voltage, a first output supplying a first output voltage having a first sign, a second output supplying a second output voltage having a second sign opposite to the first sign, a controlled switch connected between the first input and a first intermediate node, a first component connected between the first intermediate node and the first output, and a second component connected between the first intermediate node and a second intermediate node, one of the first and second components comprising an inductive element, and another of the first and second components comprising a unidirectional current conducting element, the converter being a dual voltage generating circuit connected between the second intermediate node and the second output.

BRIEF DESCRIPTION OF THE SEVERAL VIEWS OF THE DRAWINGS

For a better understanding of the present invention, embodiments thereof are now described, purely by way of non-limiting example, with reference to the attached drawings, wherein.

DETAILED DESCRIPTION OF THE INVENTION

Figure 2:
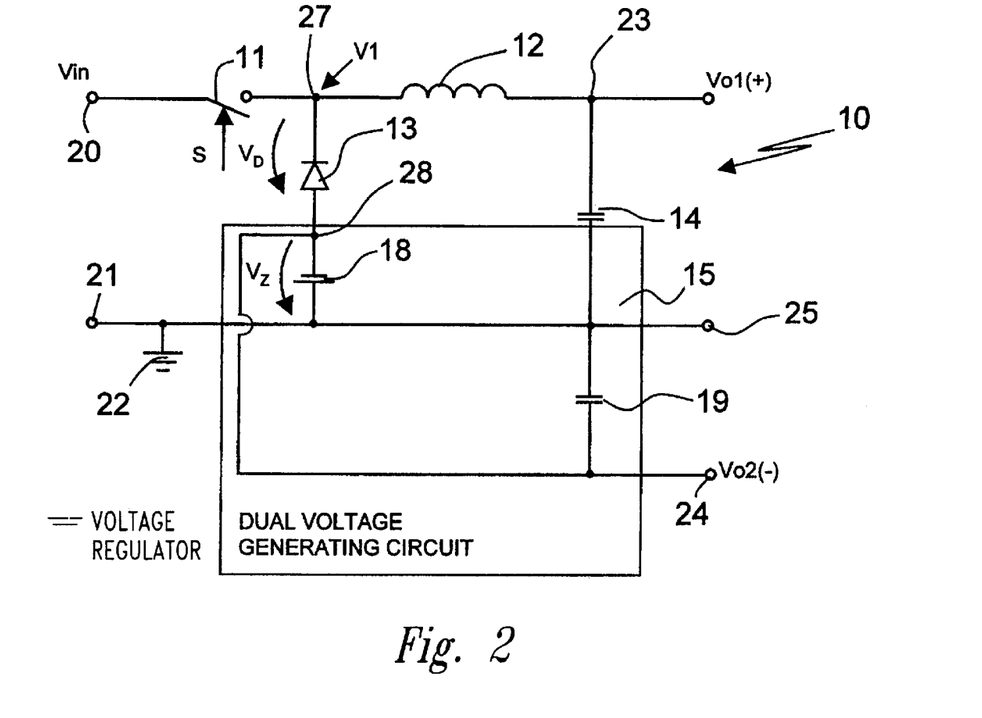
FIG. 2 is a simplified circuit diagram of a first embodiment of the converter according to the invention.

FIG. 2 shows the schematic circuit diagram of a first embodiment of the converter according to the invention. In FIG. 2, a converter 10 has a buck-type circuit topology and comprises a controlled switch 11, an inductor 12, a diode 13, a first capacitor 14, and a dual voltage generating circuit 15 including an energy recovery voltage generator 18 and a second capacitor 19. The converter 10 moreover has a first input pin 20 receiving an input voltage Vin, a second input pin 21 connected to a ground line 22, a first output pin 23 supplying a first output voltage Vo1, which is positive with respect to the ground line 22, and a second output pin 24 supplying a second output voltage Vo2, which is negative with respect to the ground line 22. The converter 10 moreover has a third output 25, which is connected to the ground line 22.

In detail, the controlled switch 11, which is formed, for example, by an NMOS transistor, has a first terminal connected to the first input pin 20, a second terminal connected to a first intermediate node 27, and a control terminal receiving a control signal S. The inductor 12 has a first terminal connected to the first intermediate node 27 and a second terminal connected to the first output pin 23.

The diode 13 has its cathode connected to the first intermediate node 27 and its anode connected to a second intermediate node 28.

The first capacitor 14 has a first pin connected to the first output pin 23 and a second pin connected to the third output pin 25 of the converter 10.

The energy recovery voltage generator 18 of the dual voltage generating circuit 15 has a negative terminal connected to the second intermediate node 28 and a positive terminal connected to the ground line 22. The second capacitor 19 has a first pin connected to the second output pin 24 and a second pin connected to the third output pin 25 of the converter 10.

The controlled switch 11 performs, in a known way, a power conversion between the first input pin 20 of the converter 10 and the first intermediate node 27. The voltage on the first intermediate node 27 is stored by the inductor 12 and filtered by the first capacitor 14, in a known way.

Figure 3:
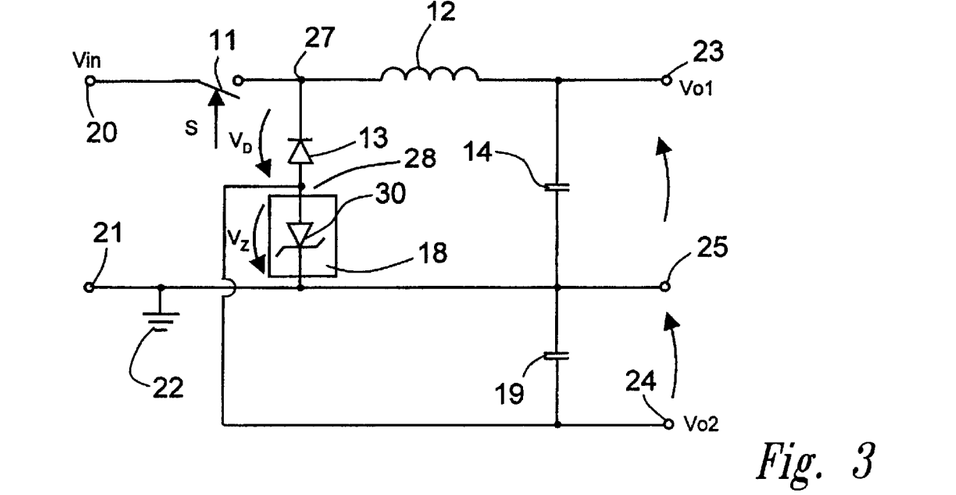
FIG. 3 shows a more detailed circuit diagram of the converter of FIG. 2.

The voltage on the first intermediate node 27 is limited by the diode 13 and by the energy recovery voltage generator 18, which enable recirculation of the current in the inductor 12. The energy recovery voltage generator 18, formed, e.g., by a first Zener diode 30, as shown in FIG. 3, limits the voltage $V_1$ on the first intermediate node 27 to a maximum negative value $V_{1M}$ of $$V_{1M}=-V_D-V_Z$$

where $V_D$ is the threshold voltage of the diode 13, and $V_Z$ is the Zener voltage of the first Zener diode 30.

In practice, during recirculation from the inductor 12, the first Zener diode 30 takes, on the second intermediate node 28, part of the recirculation energy supplied by the inductor 12 and uses this energy to charge the second capacitor 19, which filters the voltage on the second intermediate node 28 and supplies, on the second output pin 24 of the converter 10, the second output voltage Vo2, which is negative with respect to the ground line 22 and is stabilized.

In one embodiment of the invention, there is inserted such a regulation feedback circuit that is well known in the art within other voltage regulators and is not disclosed in detail herein since many acceptable examples are known and available in the art. Using such a feedback regulator is workable in the embodiment of FIGS. 2 and 3 if desired. When this is done, a regulation circuit connected between the first output pin 23 and the control inputs of the controlled switch 11 regulates the output current supplied on the first output pin 23 according to the load connected to the output pin 23. However, the quantities present on the first and second output pins 23, 24 are tied to one another; namely, the maximum current that may be supplied on the second output pin 24 is a function of the current supplied by the first output pin 23. When the first output pin 23 is connected to a constant load, sizing of the second capacitor 19 is simple and can be performed in a standard way. The limitation of the maximum current that may be supplied by the second output pin 24 is disadvantageous when the load connected to the first output pin 23 is variable. To solve this problem and render the two outputs independent of one another, according to a further embodiment of the invention, an additional control and regulation circuit is provided between the outputs of the converter 10, as shown in FIG. 4.

Figure 4:
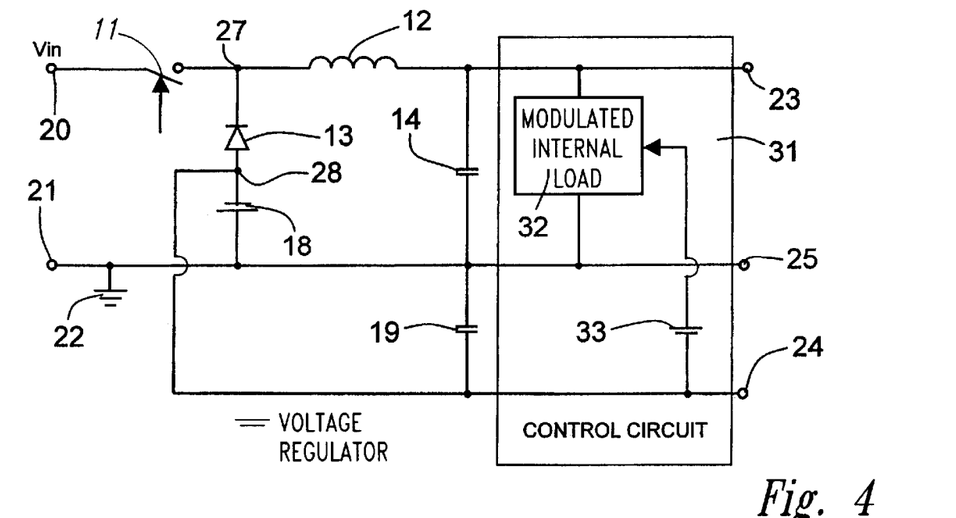
FIG. 4 shows a simplified circuit diagram of a second embodiment of the converter according to the invention.

In detail, in FIG. 4 a control circuit 31 is connected between the first, second and third output pins 23–25 of the converter 10 and comprises a modulatable load 32 and a regulation voltage generator 33.

The modulatable load 32 has a first terminal connected to the first output pin 23 of the converter 10, a second terminal connected to the third output pin 25 of the converter 10, and a control terminal connected to the positive terminal of the regulation voltage generator 33. The negative terminal of the regulation voltage generator 33 is connected to the second output pin 24 of the converter 10.

Figure 5:
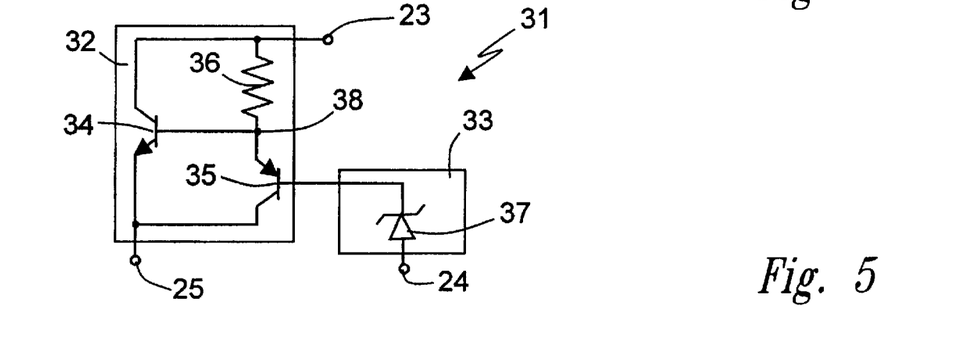
FIG. 5 shows a circuit diagram of a block of the converter of FIG. 4.

The control circuit 31 in practice forms a fictitious load whose value can be modulated according to the requirements, and it is built, for example, as shown in FIG. 5.

In FIG. 5, the modulatable load 32 is made up of a first and a second transistors 34, 35 (here of the bipolar type, but also obtainable using MOS technology), and a resistor 36. The regulation voltage generator 33 is formed by a second Zener diode 37.

In detail, the first transistor 34 is of the NPN type and has its collector connected to the first output pin 23, its emitter connected to the third output pin 25, and its base connected to a third intermediate node 38. The second transistor 35 is of the PNP type and has its emitter connected to the third intermediate node 38, its collector connected to the third output pin 25, and its base connected to the cathode of the second Zener diode 37. The resistor 36 is connected between the first output pin 23 and the third intermediate node 38. The second Zener diode 37 has its anode connected to the second output pin 24.

In the control circuit 31, the second Zener diode 37 modulates, via the second transistor 35, the base-to-emitter voltage of the first transistor 34, so to maintain the current flowing in the inductor 12 constant, even when the load connected to the first output pin 23 varies.

In this way it is possible to regulate the output voltage Vo2 at the second output pin 24 with a simple and economical solution.

Figure 6:
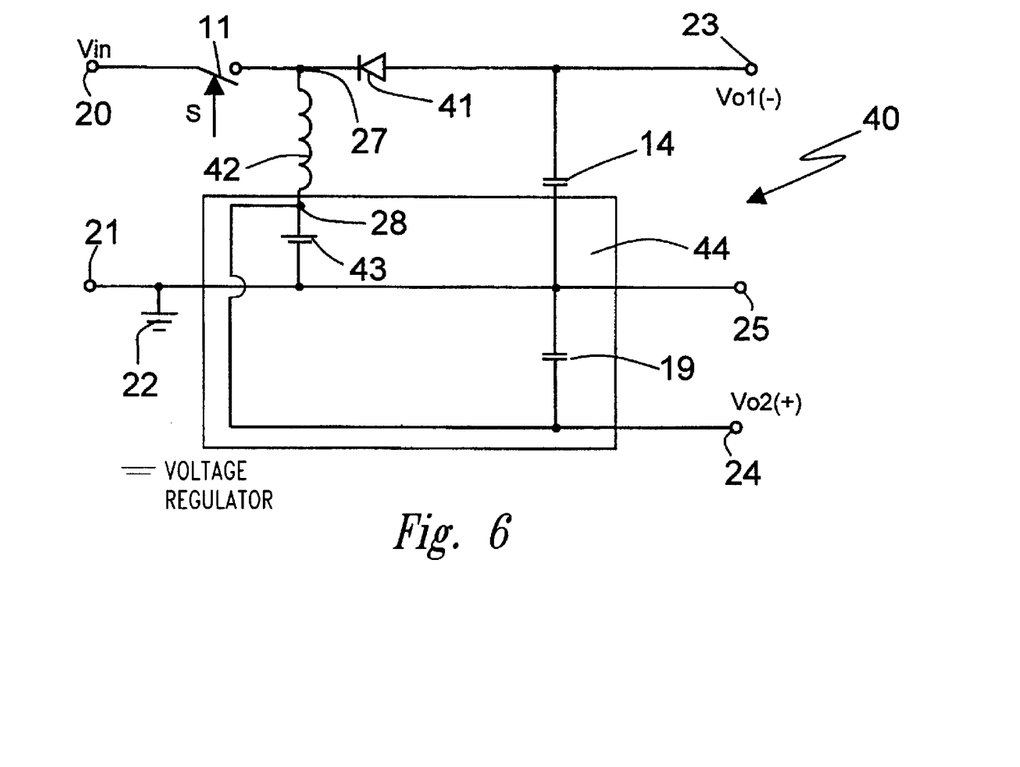
FIG. 6 shows a simplified circuit diagram of a third embodiment of the converter according to the invention.

FIG. 6 shows the working circuit diagram of a further embodiment of the converter according to the invention. In FIG. 6, a converter 40 has a buck-boost circuit topology, similar to that of the converter 10 of FIG. 2, except for the fact that the diode 41 and the inductor 42 are exchanged with each other, and the first voltage generator 43 is reverse connected. The elements in common with those of the converter 10 of FIG. 2 are therefore designated by the same reference numbers and will not be described any further.

In detail, in the converter 40, a diode 41 has its cathode connected to the first intermediate node 27 and its anode connected to the first output pin 23. An inductor 42 is connected between the first and the second intermediate nodes 27, 28; and an energy recovery voltage generator 43, belonging to a dual voltage generating circuit 44, has a positive pin connected to the second intermediate node 28 and a negative pin connected to the ground line 22.

Thereby, the converter 40 supplies a first output voltage Vo1 of negative sign on the first output pin 23, and a second output voltage Vo2 of positive sign on the second output pin 24.

Figure 7:
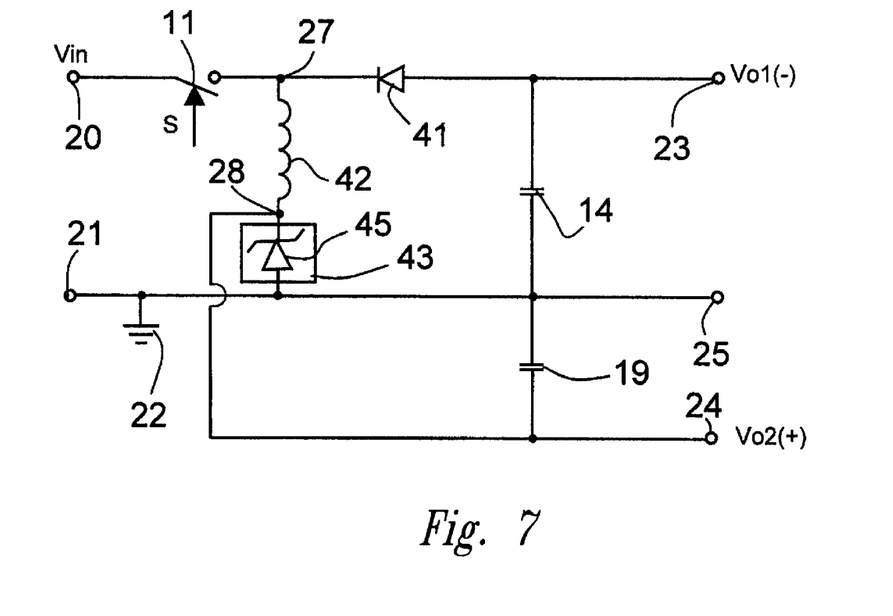
FIG. 7 shows a more detailed circuit diagram of the converter of FIG. 6.

As shown in FIG. 7, the energy recovery voltage generator 43 is preferably formed, also in the present case, by a first Zener diode 45 having its cathode connected to the second intermediate node 28 and its anode connected to the ground line 22.

Figure 8:
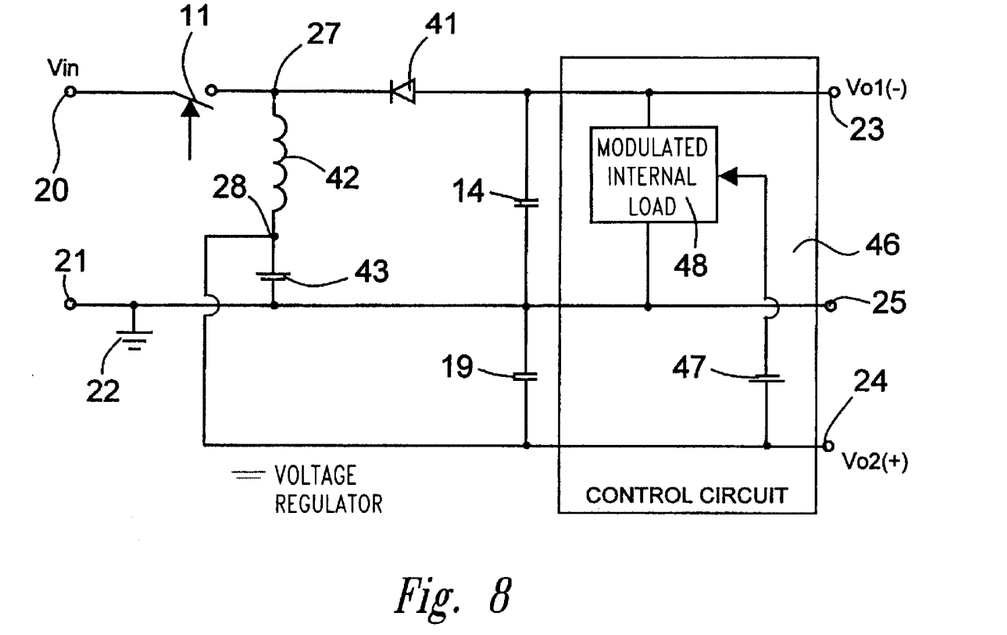
FIG. 8 shows a simplified circuit diagram of a fourth embodiment of the converter according to the invention.

As shown in FIG. 8, for regulating the second output voltage Vo2 on the second output pin 24, a control circuit 46 is connected between the first, second and third output pins 23–25 of the converter 40. The control circuit 46 comprises a modulatable load 48 and a regulation voltage generator 47.

The modulatable load 48 has a first terminal connected to the first output pin 23 of the converter 40, a second terminal connected to the third output pin 25 of the converter 40, and a control terminal connected to the negative pin of the regulation voltage generator 47. The positive pin of the regulation voltage generator 47 is connected to the second output pin 24 of the converter 40.

Figure 9:
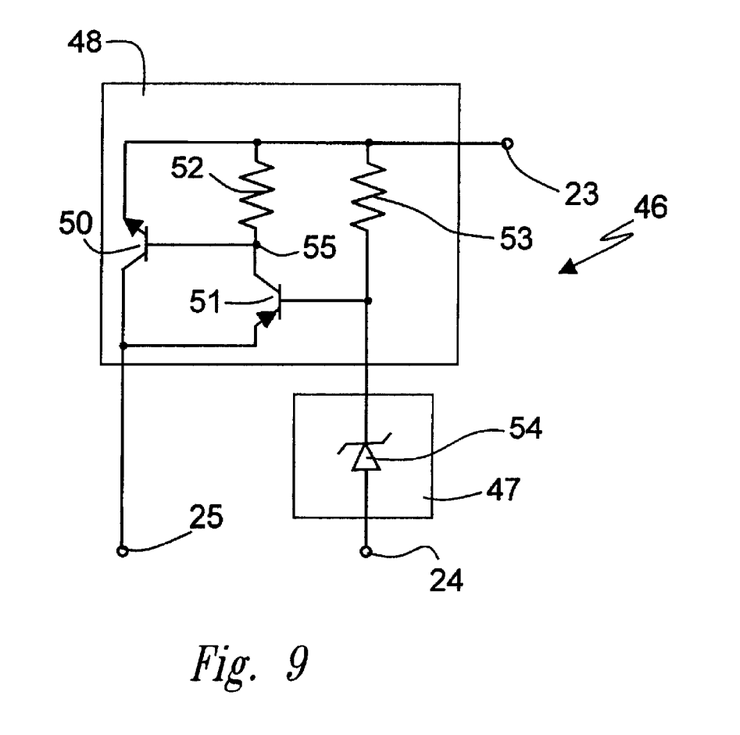
FIG. 9 shows a circuit diagram of a block of the converter of FIG. 8.

In FIG. 9, the modulatable load 48 comprises a first and a second transistor 50, 51 (here of the bipolar type, but also obtainable using MOS technology), and a first and a second resistor 52, 53. The regulation voltage generator 47 is formed by a second Zener diode 54.

In detail, the first transistor 50 is of the NPN type and has its emitter connected to the first output pin 23, its collector connected to the third output pin 25, and its base connected to a third intermediate node 55. The second transistor 51 is of the PNP type and has its collector connected to the third intermediate node 55, its emitter connected to the third output pin 25, and its base connected to the anode of the second Zener diode 54. The first resistor 52 is connected between the first output pin 23 and the third intermediate node 55. The second resistor 53 is connected between the first output pin 23 and the anode of the second Zener diode 54. The second Zener diode 54 has its cathode connected to the second output pin 24.

The dual voltage generator circuit 44 of FIG. 6 operates in a dual way with respect to the dual voltage generator circuit 15 of FIG. 2. The same applies to the control circuit 46 of FIG. 8.

The converter described has the following advantages.

First, it does not require the use of a double winding inductor for generating a voltage opposite to the main voltage, which is present on the first output pin 23.

In addition, it is simple, inexpensive and reliable, and enables independent regulation of the second output voltage Vo2 in a simple and reliable way. In particular, the present converter may be advantageously used in the case of an output current up to a maximum of 150–200 mA and for an output power of up to a maximum of 3–4 W. It may also be used in applications having higher power if the components are selected that will carry the higher power.

Finally, it is clear that modifications and variations may be made to the converter described herein, without thereby departing from the scope of the present invention.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

What is claimed is:

1. An AC/DC and DC/DC converter, comprising:
    a first input to receive an input voltage;
    a first output to supply a first output voltage, of a first sign;
    a second output to supply a second output voltage, of a second sign opposite to said first sign;
    a controlled switch, connected between said first input and a first intermediate node;
    a first component, connected between said first intermediate node and said first output;
    a second component, connected between said first intermediate node and a reference potential line, one of said first and second components comprising an inductive element and another of said first and second components comprising a unidirectional current conducting element that is open in a conduction phase of said controlled switch and closed in a recirculation phase; and
    a dual voltage generating circuit, coupled to said inductive element and connected to said second output of said converter, wherein said dual voltage generating circuit comprises a recirculation energy acquisition element, connected to said inductive element in said recirculation phase, and an energy accumulation and filtering element, connected between said recirculation energy acquisition element and said second output of said converter, wherein the dual voltage generating circuit can use at least part of an energy stored by the inductive element to generate the second output voltage during the recirculation phase.

2. The converter according to claim 1 wherein said dual voltage generating circuit is connected between said second component and said reference potential line, and forms, with said second component, a second intermediate node;
    said recirculation energy acquisition element being connected between said second intermediate node and said reference potential line; and
    said energy accumulation and filtering element being connected between said reference potential line and said second output.

3. The converter according to claim 2 wherein said recirculation energy acquisition element comprises a first voltage generator.

4. The converter according to claim 3 wherein said recirculation energy acquisition element comprises a first Zener diode.

5. The converter according to claim 4 wherein said energy accumulation and filtering element comprises a capacitive element.

6. The converter according to claim 5, further comprising a regulation circuit connected to said second output.

7. The converter according to claim 6 wherein said regulation circuit comprises:
    a modulated load connected between said first output and said reference potential line and having a modulation input connected to said second output.

8. The converter according to claim 7 wherein said modulation input of said modulated load is connected to said second output via a second voltage generator.

9. The converter according to claim 8 wherein said modulated load comprises:
    a first transistor element connected between said first output and said reference potential line and having a control input;
    a second transistor element connected between said control input of said first transistor element and said reference potential line and having a control terminal; and
    said second voltage generator comprises a second Zener diode connected between said control input of said second transistor element and said second output.

10. The converter according to claim 5 wherein said first component is an inductor and said second component is a diode having a cathode connected to said first intermediate node, and an anode connected to said second intermediate node, and wherein said first Zener diode having an anode connected to said second intermediate node and a cathode connected to said reference potential line.

11. The converter according to claim 9 wherein said first component is an inductor and said second component is a diode having a cathode connected to said first intermediate node, and an anode connected to said second intermediate node, and wherein said second Zener diode having a cathode connected to said control input of said second transistor element, and an anode connected to said second output.

12. The converter according to claim 5 wherein said first component is a diode having a cathode connected to said first intermediate node and an anode connected to said first output, and said second component is an inductor, and wherein said first Zener diode having a cathode connected to said second intermediate node, and an anode connected to said reference potential line.

13. The converter according to claim 9 wherein said first component is a diode having a cathode connected to said first intermediate node and an anode connected to said first output, and said second component is an inductor, and wherein said second Zener diode having an anode connected to said control input of said second transistor element and a cathode connected to said second output.

14. An AC/DC and DC/DC converters comprising:
    a first input terminal to receive an input voltage;
    a first output terminal to supply a first output voltage, of a first sign;
    a second output terminal to supply a second output voltage, of a second sign opposite to said first sign;
    a controlled switch, connected between said first input terminal and a first intermediate node;
    a first component, connected between said first intermediate node and said first output terminal; and a second component, connected between said first intermediate node and a second intermediate node, wherein one of said first and second components comprises an inductive element and another of said first and second components comprises a unidirectional current conducting element, thereby forming a dual voltage generating circuit connected between said second intermediate node and said second output terminal, wherein the dual voltage generating circuit is coupled to use at least part of an energy supplied by the inductive element to generate the second output voltage during a recirculation phase.

15. A method for AC/DC and DC/DC conversion, comprising the steps of:

supplying an input voltage to an output filter comprising an inductive component in a first operating step;

filtering said input voltage to generate a first output voltage, of a first sign;

interrupting said step of supplying an input voltage;

causing a recirculation current to flow through said inductive element in a second operating step, said recirculation current being associated to a recirculation energy;

acquiring, in said second operating step, at least part of said recirculation energy; and accumulating said part of the recirculation energy in a storage element to generate a second output voltage, of a second sign opposite to said first sign, directly from said part of the recirculation energy.

16. A converter, comprising:

a switch having a control terminal, input terminal coupled to an input node of the converter, and an output terminal;

a first device having a first terminal coupled to the output terminal of the switch, and a second terminal coupled to a first output node of the converter;

a second device having a first terminal coupled to the first terminal of the first device, and a second terminal coupled to a second output node of the converter;

an energy recovery device having a first terminal coupled to the second terminal of the second device and to the second output node of the converter, and a second terminal coupled to a reference line;

a first charge storage device having a first terminal coupled to the second terminal of the first device, and a second terminal coupled to the reference line;

a second charge storage device having a first terminal coupled to the second output node of the converter, and a second terminal coupled to the reference line; and a variable load control circuit having a first terminal coupled to the first output node of the converter, a second terminal coupled to the second output node of the converter, and a third terminal coupled to the reference line wherein the energy recovery device is coupled to use at least part of an inductor energy provided from either one of the first or second devices to generate an output voltage at the second output node of the converter during a recirculation phase.

17. The converter according to claim 16 wherein the first device comprises an inductor, and the second device comprises a diode.

18. The converter according to claim 16 wherein the first device comprises a diode, and the second device comprises an inductor.

19. The converter according to claim 16 wherein the energy recovery device comprises a Zener diode.

20. The converter according to claim 16 wherein the variable load control circuit comprises:

a first transistor having control, first and second terminals wherein the first terminal is coupled to the first output node of the converter, and the second terminal is coupled to the reference line;

a second transistor having control, first and second terminals wherein the first terminal is coupled to the reference line, and the second terminal is coupled to the control terminal of the first transistor;

a resistor having a first and second terminals wherein the first terminal is coupled to the first output node of the converter, and the second terminal is coupled to the control terminal of the first transistor; and a diode having first and second terminals wherein the first terminal is coupled to the control terminal of the second transistor, and the second terminal is coupled to the second output node of the converter.

21. The converter according to claim 16 wherein the variable load control circuit comprises:

a first transistor having control, first and second terminals wherein the first terminal is coupled to the first output node of the converter, and the second terminal is coupled to the reference line;

a second transistor having control, first and second terminals wherein the first terminal is coupled to the reference line, and the second terminal is coupled to the control terminal of the first transistor;

a first resistor having a first and second terminals wherein the first terminal is coupled to the first output node of the converter, and the second terminal is coupled to the control terminal of the first transistor;

a second resistor having first and second terminals wherein the first terminal is coupled to the first output node of the converter, and the second terminal is coupled to the control terminal of the second transistor; and a diode having first and second terminals wherein the first terminal is coupled to the first output node of the converter, and the second terminal is coupled to the second output node of the converter.

22. An apparatus, comprising:

a first input terminal to receive an input voltage;

a first output terminal to supply a first output voltage, of a first sign;

a second output terminal to supply a second output voltage, of a second sign opposite to said first sign;

a controlled switch, connected between said first input terminal and a first intermediate node;

a first component, connected between said first intermediate node and said first output terminal;

a second component, connected between said first intermediate node and a reference potential line, one of said first and second components comprising an inductive element and another of said first and second components comprising a unidirectional current conduction element that is open in a conduction phase of said controlled switch and closed in a recirculation phase; and a dual voltage generator circuit, coupled to said inductive element and connected to said second output terminal, wherein said dual voltage generator circuit comprises a voltage generator having a Zener diode, connected to said inductive element in said recirculation phase, and a capacitive element, connected between said Zener diode and said second output terminal, wherein said dual voltage generator circuit is connected between said second component and said reference potential line, and forms, with said second component, a second intermediate node, wherein said Zener diode being connected between said second intermediate node and said reference potential line, and said capacitive element being connected between said reference potential line and said second output terminal, and wherein said first component comprises an inductor and said second component comprises a diode having a cathode connected to said first intermediate node, and an anode connected to said second intermediate node, and wherein said Zener diode has an anode connected to said second intermediate node and a cathode connected to said reference potential line.

23. The apparatus of claim 22, further comprising a regulation circuit coupled to the second output terminal.

24. The apparatus of claim 23 wherein the regulation circuit comprises a modulated load coupled between the first output terminal and the reference potential line, and having a modulation input coupled to the second output terminal.

25. An apparatus, comprising:
a first input terminal to receive an input voltage;
a first output terminal to supply a first output voltage, of a first sign;
a second output terminal to supply a second output voltage, of a second sign opposite to said first sign;
a controlled switch, connected between said first input terminal and a first intermediate node;
a first component, connected between said first intermediate node and said first output terminal;
a second component, connected between said first intermediate node and a reference potential line, one of said first and second components comprising an inductive element and another of said first and second components comprising a unidirectional current conduction element that is open in a conduction phase of said controlled switch and closed in a recirculation phase; and
a dual voltage generator circuit, coupled to said inductive element and connected to said second output terminal, wherein said dual voltage generator circuit comprises a voltage generator having a Zener diode, connected to said inductive element in said recirculation phase, and a capacitive element, connected between said Zener diode and said second output terminal, wherein
said dual voltage generator circuit is connected between said second component and said reference potential line, and forms, with said second component, a second intermediate node, wherein
said Zener diode being connected between said second intermediate node and said reference potential line, and said capacitive element being connected between said reference potential line and said second output terminal, and wherein
said first component comprises a diode having a cathode connected to said first intermediate node and an anode connected to said first output, and said second component comprises an inductor, and wherein said Zener diode has a cathode connected to said second intermediate node, and an anode connected to said reference potential line.

26. The apparatus of claim 25, further comprising a regulation circuit having a modulated load and being coupled to the second output terminal.

27. The apparatus of claim 26 wherein the regulation circuit comprises:
a first transistor element coupled between said first output terminal and said reference potential line and having a control input terminal;
a second transistor element connected between said control input terminal of said first transistor element and said reference potential line and having a control terminal; and
another voltage generator having another Zener diode connected between said control input terminal of said second transistor element and said second output terminal.

28. An apparatus, comprising:
a switch having a control terminal, an input terminal coupled to an input node, and an output terminal;
a first device having a first terminal coupled to the output terminal of the switch, and a second terminal coupled to a first output node;
a second device having a first terminal coupled to the first terminal of the first device, and a second terminal coupled to a second output node;
an energy recovery device having a first terminal coupled to the second terminal of the second device and to the second output node, and a second terminal coupled to a reference node;
a first charge storage device having a first terminal coupled to the second terminal of the first device, and a second terminal coupled to the reference node;
a second charge storage device having a first terminal coupled to the second output node, and a second terminal coupled to the reference node; and
a variable load control circuit having a first terminal coupled to the first output node, a second terminal coupled to the second output node, and a third terminal coupled to the reference node, wherein the variable load control circuit includes:
a first transistor having control, first and second terminals wherein its first terminal is coupled to the first output node, and its second terminal is coupled to the reference node;
a second transistor having control, first and second terminals wherein its first terminal is coupled to the reference node, and its second terminal is coupled to the control terminal of the first transistor;
a resistor having a first and second terminals wherein its first terminal is coupled to the first output node, and its second terminal is coupled to the control terminal of the first transistor; and
a diode having first and second terminals wherein its first terminal is coupled to the control terminal of the second transistor, and its second terminal is coupled to the second output node.

29. The apparatus of claim 28 wherein the first device comprises an inductor and the second device comprises another diode.

30. The apparatus of claim 28 wherein the energy recovery device comprises a Zener diode.

31. An apparatus, comprising:
a switch having a control terminal, an input terminal coupled to an input node, and an output terminal;
a first device having a first terminal coupled to the output terminal of the switch, and a second terminal coupled to a first output node;

a second device having a first terminal coupled to the first terminal of the first device, and a second terminal coupled to a second output node;

an energy recovery device having a first terminal coupled to the second terminal of the second device and to the second output node, and a second terminal coupled to a reference node;

a first charge storage device having a first terminal coupled to the second terminal of the first device, and a second terminal coupled to the reference node;

a second charge storage device having a first terminal coupled to the second output node, and a second terminal coupled to the reference node; and a variable load control circuit having a first terminal coupled to the first output node, a second terminal coupled to the second output node, and a third terminal coupled to the reference node, wherein the variable load control circuit includes:

a first transistor having control, first and second terminals wherein its first terminal is coupled to the first output node, and the second terminal is coupled to the reference node;

a second transistor having control, first and second terminals wherein its first terminal is coupled to the reference node, and its second terminal is coupled to the control terminal of the first transistor;

a first resistor having a first and second terminals wherein its first terminal is coupled to the first output node, and its second terminal is coupled to the control terminal of the first transistor;

a second resistor having first and second terminals wherein its first terminal is coupled to the first output node, and its second terminal is coupled to the control terminal of the second transistor; and a diode having first and second terminals wherein its first terminal is coupled to the first output node, and its second terminal is coupled to the second output node.

32. The apparatus of claim 31 wherein the first device comprises another diode and the second device comprises an inductor.

33. The apparatus of claim 31 wherein the energy recovery device comprises a Zener diode.

* * * * *